United States Patent [19]

Compton

[11] 4,256,020
[45] Mar. 17, 1981

[54] CRASHWORTHY FUEL PUMP IMPROVEMENT

[75] Inventor: Donald R. Compton, Belleville, Ill.

[73] Assignee: ACF Industries, Incorporated, New York, N.Y.

[21] Appl. No.: 80,265

[22] Filed: Oct. 1, 1979

[51] Int. Cl.³ .............................................. F04B 43/02
[52] U.S. Cl. ...................................... 92/102; 417/471
[58] Field of Search .............. 92/98 R, 102; 417/313, 417/470, 471, 540–542, 570, 571

[56] References Cited

U.S. PATENT DOCUMENTS

| | | | |
|---|---|---|---|
| 1,108,146 | 8/1914 | Deegan | 92/102 |
| 2,786,423 | 3/1957 | Coffey | 92/102 |
| 3,362,341 | 1/1968 | Quatrideniers | 417/571 |
| 3,364,870 | 1/1968 | Quatrideniers | 417/571 |
| 3,635,598 | 1/1972 | Seipter | 417/471 |
| 3,912,423 | 10/1975 | Pfabe | 417/471 |

FOREIGN PATENT DOCUMENTS

| | | | |
|---|---|---|---|
| 2604015 | 9/1976 | Fed. Rep. of Germany | 417/471 |
| 1413536 | 11/1975 | United Kingdom | 417/471 |

*Primary Examiner*—William L. Freeh
*Attorney, Agent, or Firm*—J. Joseph Muller

[57] ABSTRACT

A fuel pump improvement comprises a lip formed around the periphery of the open end of a fuel pump body. The lip is bendable over the outer margin of a diaphragm to form a fluid seal therewith. A second seal is provided between the diaphragm and the lip to seal against any fluid leak which may be created when the fuel pump is subjected to abnormal forces during a crash.

5 Claims, 3 Drawing Figures

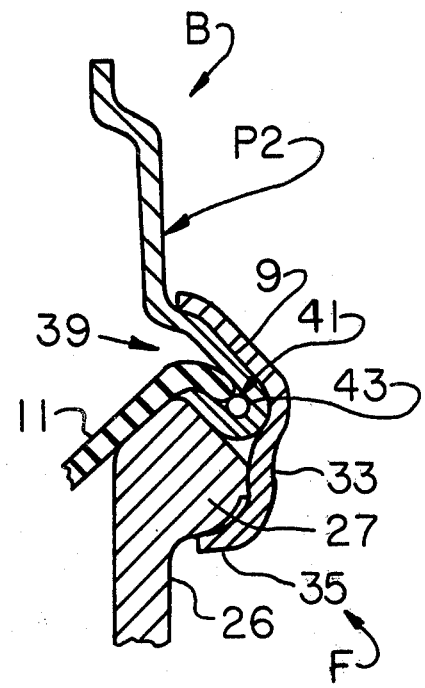
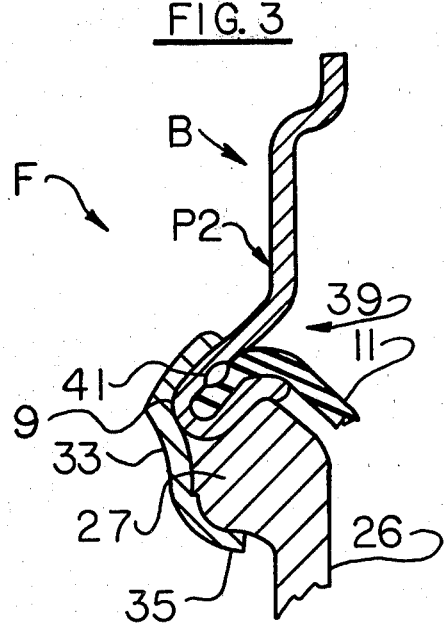

CRASHWORTHY FUEL PUMP IMPROVEMENT

BACKGROUND OF THE INVENTION

This invention relates to fuel pumps and, more particularly, to a crashworthy fuel pump capable of withstanding extreme forces such as occur during a crash without leaking fuel.

Because of their location in the engine compartment of an automobile, fuel pumps are susceptible to damage during a crash as the result of being struck by debris flying about in the compartment. As a consequence, fuel leaks from the pump may occur. The presence of gasoline in the engine compartment due to a broken fuel pump creates a great risk of fire and potential harm to both the vehicle and its occupants.

Federal Motor Vehicle Safety Standard (FMVSS) 30 was issued in an attempt to reduce the hazards attendant the location of the fuel pump in the engine compartment by requiring that the risk of damage to a fuel pump during a crash be minimized. To comply with this standard, various schemes have been proposed to shield the fuel pump or otherwise protect it from flying debris. However, these protective shields add weight to the vehicle, may be difficult to fit into already crowded engine compartments, and may not always prevent an object from striking a fuel pump.

SUMMARY OF THE INVENTION

Among the several objects of the present invention may be noted the provision of an improvement in a crashworthy fuel pump; the provision of such a fuel pump improvement by which additional protection against a fuel leak which might occur as a result of a crash is attained; the provision of such a fuel pump improvement which is readily incorporated in a crashworthy fuel pump; and the provision of such a fuel pump improvement by which the seal integrity between a body of the fuel pump and the fuel pump diaphragm is enhanced.

Briefly, the improvement of the present invention comprises a lip formed around the periphery of the open portion of a pump body, the lip being bendable over the outer margin of a diaphragm to clamp the diaphragm within the body and form a fluid seal therewith. Means are provided for clamping the body and a housing together to form a unified assembly and means adjacent the diaphragm and within the seal formed between the diaphragm and the lip seal against any fluid leak which may be created when the fuel pump assembly is subjected to abnormal forces such as occur during a crash. Other objects and features will be in part apparent and in part pointed out hereinafter.

BRIEF DESCRIPTION OF THE DRAWINGS

FIGS. 2 and 3 illustrate alternate embodiments of the improvement of the present invention.

Corresponding reference characters indicate corresponding parts throughout the several views of the drawings.

DESCRIPTION OF PREFERRED EMBODIMENTS

Figure 1:
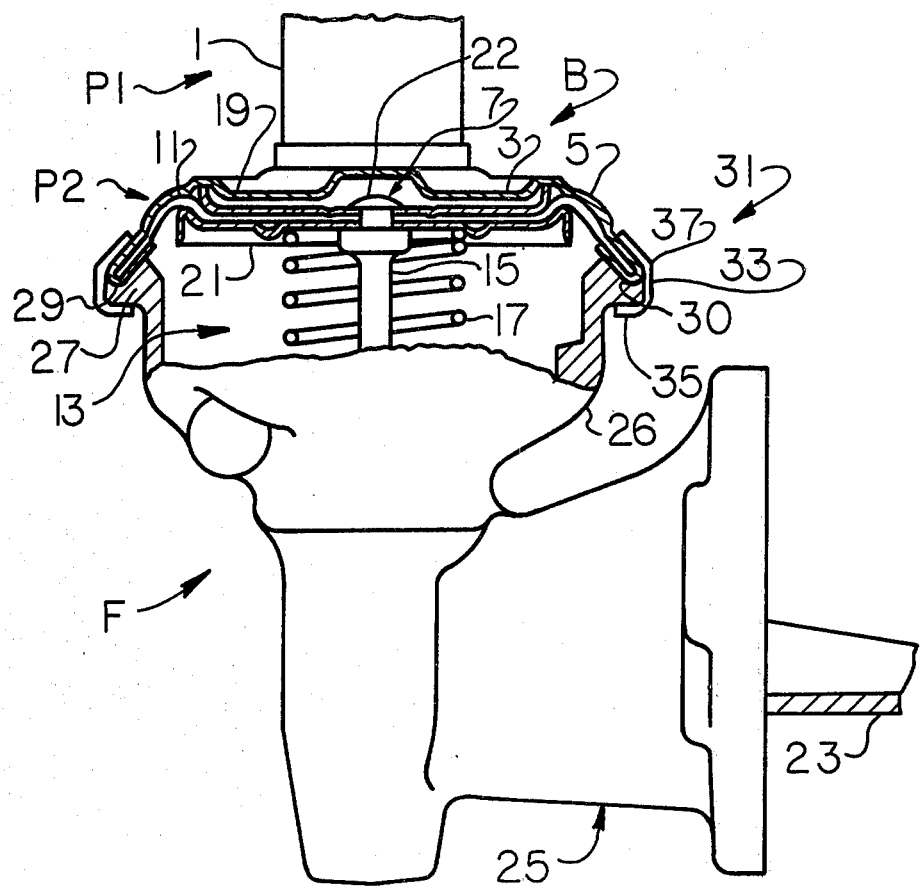
FIG. 1 is a sectional view of a crashworthy fuel pump intallable in the engine compartment of a vehicle.

Referring to the drawings, a crashworthy fuel pump F for use in an automotive fuel system comprises a pump body, generally indicated B, which is of one-piece, thin-walled, sheet metal construction. Body B has a first portion P1 in which are formed two integral deep-drawn cylindrical cupshaped projections, one of which is partially shown in FIG. 1 and is indicated by reference numeral 1. One of the projections defines an intake cavity for the fuel pump and the other projection defines a discharge cavity for the pump. A properly oriented check valve (not shown) is located in each cavity to control fuel flow into and out of the fuel pump and appropriate fittings (also not shown) are located at the outer end of each projection for connecting the fuel pump into the fuel system. Check valves and fittings of the type shown in U.S. Pat. No. 3,096,722 to Fitzgerald et al, issued July 9, 1963, are illustrative of those which may be used in fuel pump F.

Body B has a second portion P2 of a shallow cup shape, having an end wall 3 and a flaring annular peripheral wall 5 forming a fuel pumping chamber 7. One end of each cavity 1 is in fluid communication with the pumping chamber. The lower end of body portion P2 is open.

An annular diaphragm 11 closes pumping chamber 7. The diaphragm consists of a relatively thin disk of flexible, fuel-resistant material such as suitable synthetic rubber. In its unstressed condition the diaphragm is essentially flat. The diaphragm is insertable into the open end of the second portion of body B.

Means, indicated generally 13, flex diaphragm 11 to pump fuel into and out of pumping chamber 7 through the respective intake and discharge cavities. Means 13 comprises a diaphragm actuating rod 15 and a spring 17. Diaphragm 11 is sandwiched between a pair of backing plates 19 and 21 respectively. Rod 15 extends through the backing plates and the diaphragm and the end of the rod is spun over. One end of spring 17 seats against the underside of plate 21. A rocker arm 23 is operable by an engine driven eccentric cam (not shown). The inner end of the rocker arm is attached to the other end of rod 15 and pulls diaphragm 11 downwardly and creates the intake stroke of the pump. Spring 17 pushes the diaphragm upwardly at the end of the intake stroke to produce the discharge stroke of the pump.

Means 13 is housed in a housing 25. The housing has a hollow conical pump head 26. The pump head has an outwardly extending circumferential rim 27 the upper face of which is downwardly and outwardly sloped. At the base of the slope is a shallow groove 29. The groove and slope form a seat for the diaphragm/pump body assembly which is formed as described hereinafter.

The improvement of the present invention comprises a lip 30 formed around the periphery of the open end of body portion P2. As shown in FIG. 1, lip 30 of the pump body is bendable over the outer margin of the diaphragm to clamp the diaphragm within the pump body. The entire outer margin of the diaphragm is so clamped and the result is a fluid-tight seal between the pump body and the diaphragm.

A means indicated generally 31 clamps body B and housing 25 together to form a unified fuel pump assembly. As shown in FIG. 1, clamping means 31 comprises a circular ring 33 which is fitted around the body and the housing to join the two together. Ring 33 has an inturned lower margin forming a lip 35. The inner face of this lip abuts the bottom outer surface of lip 27 when the pump is assembled. The ring has an upwardly extending circumferential side 37 whose height is such that the side extends beyond the joining surfaces of body B and housing 35. The upper portion of side 37 is crimped over the top of body B after the body and housing are brought into mating abutment so as to clamp the body and housing together as shown in FIG. 1.

Referring to FIGS. 2 and 3, the improvement of the present invention further comprises means indicated generally 39 for sealing any fluid leak which may occur between diaphragm 11 and lip 9 when the fuel pump assembly is subjected to abnormal forces such as those which occur during a crash. Means 39 includes an O-ring 41 which is a gasoline sensitive material which swells when it comes into contact with gasoline thus to seal any leak which may occur in or around the diaphragm. O-ring 41 is positioned adjacent diaphragm 11 and within the seal formed between the diaphragm and lip 30. As shown in FIG. 2, the O-ring may be located in a pocket 43 formed in the bend of lip 30 when it is bent over to form the seal with diaphragm 11. Alternatively, and as shown in FIG. 3, the O-ring may be placed against one face, preferably, the inner face of the diaphragm and compressed against the diaphragm when the lip is bent over.

In either event, if the diaphragm is ruptured as the result of a crash, the O-ring will swell when any gasoline flowing through the leaks comes into contact with it. It has been experimentally found that the seal created by clamping diaphragm 11 to body B will not be violated even if the body is severely deformed. However, sealing means 39 provides additional leak protection and thus makes the possibility of a leak and the potential harmful consequences resulting therefrom even more remote.

In view of the above, it will be seen that the several objects of the inventions are achieved and other advantageous results obtained.

As various changes could be made in the above constructions without departing from the scope of the invention, it is intended that all matter contained in the above description and shown in the accompanying drawing shall be interpreted as illustrative and not in a limiting sense.

What is claimed is:

1. In a fuel pump for use in an automotive fuel system the fuel pump including a body having a first portion in which is formed a fuel intake cavity and a fuel discharge cavity and a second portion in which is formed a fuel pumping chamber, one end of each cavity being in fluid communication with the pumping chamber, a flexiable diaphragm closing the pumping chamber, the diaphragm being insertable into the open end of the second portion of the body, means for flexing the diaphrgm to pump fuel into and out of the pumping chamber through the respective intake and discharge cavities and a housing in which the flexing means is housed, the housing having one end formed for abutment with the open end portion of the body, the improvement comprising a lip formed around the periphery of the open portion of the body, the lip being bendable over the outer margin of the diaphragm to clamp the diaphragm within the body and form a fluid seal therewith, means for clamping the body and housing together to form a unified assembly, and means adjacent the diaphragm and within the seal formed between the diaphragm and the lip for sealing any fluid leak which may be created when the fuel pump assembly is subjected to abnormal forces such as occur during a crash.

2. The improvement as set forth in claim 1 wherein the sealing means comprises a gasoline sensitive material which swells when it comes into contact with gasoline thus to seal any leak which may occur in or around the diaphragm when a crash occurs.

3. The improvement as set forth in claim 2 wherein the sealing means comprises on O-ring of gasoline sensitive silicone material.

4. The improvement as set forth in claim 3 wherein the O-ring is positioned in a pocket formed in the bend of the lip when it is bent over to form the seal with the diaphragm.

5. The improvement as set forth in claim 3 wherein the O-ring is positioned against one face of the diaphragm and is compressed against the diaphragm when the lip is bent over the diaphragm to form the seal therewith.

* * * * *